US012748797B2

(12) United States Patent
Kaddoura

(10) Patent No.: US 12,748,797 B2
(45) Date of Patent: Sep. 29, 2026

(54) HYBRID APPROACH FOR AUTOMATED GAP ANALYSIS WITH COURSE COMPETENCY

(71) Applicant: Zayed University, Abu Dhabi (AE)

(72) Inventor: Sanaa Kaddoura, Abu Dhabi (AE)

(73) Assignee: Zayed University, Abu Dhabi (AE)

(*) Notice: Subject to any disclaimer, the term of this patent is extended or adjusted under 35 U.S.C. 154(b) by 0 days.

(21) Appl. No.: 18/731,655

(22) Filed: Jun. 3, 2024

(65) Prior Publication Data

US 2025/0371056 A1 Dec. 4, 2025

(51) Int. Cl.

| | |
|---|---|
| ***G06F 16/335*** | (2019.01) |
| ***G06F 16/35*** | (2025.01) |
| ***G06F 40/242*** | (2020.01) |
| ***G06Q 50/20*** | (2012.01) |

(52) U.S. Cl.

CPC ............ *G06F 16/335* (2019.01); *G06F 16/35* (2019.01); *G06F 40/242* (2020.01); *G06Q 50/20* (2013.01)

(58) Field of Classification Search

CPC ...... G06F 16/335; G06F 16/35; G06F 40/242; G06Q 50/20

USPC .......................................................... 705/326

See application file for complete search history.

(56) References Cited

U.S. PATENT DOCUMENTS

| | | | | |
|---|---|---|---|---|
| 2010/0233663 | A1* | 9/2010 | Pennington | G09B 19/00 434/219 |
| 2018/0181916 | A1* | 6/2018 | Madhavan | G06Q 10/063112 |
| 2020/0349523 | A1* | 11/2020 | Madhavan | G06Q 50/2057 |
| 2020/0364270 | A1* | 11/2020 | Harpale | G06F 40/20 |
| 2022/0130272 | A1* | 4/2022 | Foroughi | G09B 7/00 |
| 2022/0327492 | A1* | 10/2022 | Vontobel | G06F 40/279 |
| 2023/0306351 | A1* | 9/2023 | Markman | G06Q 10/1053 |
| 2024/0281446 | A1* | 8/2024 | Bathwal | G06F 16/93 |
| 2025/0315609 | A1* | 10/2025 | Kosslyn | G06F 40/56 |
| 2025/0322242 | A1* | 10/2025 | Gupta | G06N 3/0895 |

OTHER PUBLICATIONS

Victor Sahn et al., "DistilBERT, a distilled version of BERT: smaller, faster, cheaper and lighter", Feb. 2020, retrieved from https://arxiv.org/abs/1910.01108 (Year: 2020).*

Kwon, Office Action, pp. 1-6, United Arab Emirates Ministry of Economy and Toursim, Nov. 28, 2025.

* cited by examiner

*Primary Examiner* — Jessica Lemieux
*Assistant Examiner* — Joshua D Schneider

(57) ABSTRACT

There is provided a computer-implemented method for automated gap analysis that performs the steps of: generating a job competencies dataset, generating a course competencies dataset; generating a missing competencies dataset based on the job competencies dataset and the course competencies dataset, and outputting a recommended course dataset. The method identifies job competencies missing in course competencies, and recommends courses in which to include the missing competencies. The approach to competency identification comprises either a hybrid approach composed of rule-based matching and/or similarity matching, or a pre-trained large language model (LLM).

17 Claims, 9 Drawing Sheets

HYBRID APPROACH FOR AUTOMATED GAP ANALYSIS WITH COURSE COMPETENCY

FIELD

The present disclosure concerns automated gap analysis. More specifically, but not exclusively, the present disclosure concerns a hybrid approach for automated gap analysis.

BACKGROUND

Background description includes information that will be useful in understanding the present invention. It is not an admission that any of the information provided herein is prior art or relevant to the presently claimed invention, or that any publication specifically or implicitly referenced is prior art.

The digitization of the job market has led to a multitude of online databases/platforms on which prospective job applicants can seek employment. As jobs become more competitive, the job competency requirements evolve and diversify rapidly, with new and/or different job competencies being required each year.

It is a strategic objective of educational institutions to provide their students with the optimal competencies so that their students have the best opportunities to successfully seek employment in the evolving job market.

Gap analysis can be referred to as the analysis of the difference between the skills or competencies taught within educational courses, and skills or competencies required by jobs (within a particular field or role) within the job market.

Analysis of current job requirements is often done manually by course administrators, and infrequently so. This leads to the introduction of human error, and the missing of key competencies that are required by the job market that may be missing in the courses taught within educational courses. This leads to suboptimal course design that does not best suit students needs when they graduate and begin to seek employment within the job market.

Analysis that is done manually is also incapable of providing insights relating to the relative demand for specific skills within the job market.

The present disclosure seeks to mitigate the abovementioned problems. More specifically, but not exclusively, the present disclosure seeks to provide an improved approach for gap analysis.

SUMMARY

According to a first aspect of the present disclosure, there is provided a computer-implemented method that, when performed by one or more computing devices, causes the one or more computing devices to perform the steps of: receiving a user input comprising educational study identification; generating a job competencies dataset; generating a course competencies dataset; generating a missing competencies dataset; and outputting a recommended course dataset.

Generating a job competencies dataset comprises the step of extracting a set of job postings from an online database that corresponds to the educational study identification. Generating the job competencies dataset also comprises identifying job competencies using one or more of: using a preconfigured competencies dictionary to identify job competencies within the set of job postings, wherein the job competencies are identified using rule-based matching; using the preconfigured competencies dictionary to identify job competencies within the set of job postings, wherein the job competencies are identified using similarity matching; or using a pre-trained large language model (LLM) to classify extracted phrases from the set of job postings as job competencies. Generating the job competencies dataset also comprises outputting the identified job competencies to generate the job competencies dataset.

Generating a course competencies dataset comprises the step of identifying a plurality of educational course syllabi that correspond to the educational study identification. Generating the course competencies dataset also comprises identifying course competencies using one or more of: using the preconfigured competencies dictionary to identify course competencies within the educational course syllabi, wherein the course competencies are identified using rule-based matching; using the preconfigured competencies dictionary to identify course competencies within the educational course syllabi, wherein the course competencies are identified using similarity matching; or using a pre-trained large language model (LLM) to classify extracted phrases from the educational course syllabi as course competencies. Generating the course competencies dataset also comprises outputting the identified course competencies to generate the course competencies dataset.

Generating a missing competencies dataset comprises the steps of: mapping competencies within the course competencies dataset with competencies within the job competencies dataset to generate a list of common competencies; and generating the missing competencies dataset.

Outputting a recommended course dataset comprises the steps of: generating pairs of embeddings for both the educational course syllabi/competencies dataset, and the missing competencies dataset; measuring similarity between the each embedding pair; outputting at least one educational course syllabus of the educational course syllabi, and corresponding missing competency of the missing competencies dataset, belonging to an embedding pair that has similarity within a predetermined range, as the recommended course dataset for the educational study identification; and displaying the output on an interactive dashboard to a user.

Advantageously, the method according to the present disclosure is capable of automatically extracting competencies from both job postings provided on online databases (such as online job portals/platforms) and competencies from educational course syllabi.

Generating the pairs of embeddings within the step of outputting a recommended course dataset may comprise generating pairs of embeddings for both the educational course syllabi and the missing competencies dataset. Generating the pairs of embeddings within the step of outputting a recommended course dataset may comprise generating pairs of embeddings for both the course competencies dataset and the missing competencies dataset.

In embodiments, the educational course syllabi are provided by the user of the platform. In embodiments, the platform searches an online database for the educational course syllabi.

By using all the course syllabi associated with a particular educational study identification, the platform is able to obtain a holistic overview of the competencies that are taught across all the courses that sit within an educational study identification. In embodiments, the educational study identification is a major. For example, the major (educational study identification) may be chemical engineering, and the courses may comprise fluid mechanics, thermodynamics, mathematics, pharmaceutical engineering, languages, and entrepreneurship, for example. The course syllabi may comprise a course syllabus for each course that is offered within the educational study identification.

Advantageously, the use of a hybrid approach for the competency extraction (rule-based matching and similarity matching competency extraction) or an AI/ML approach (pre-trained large language model (LLM) competency extraction) enhances the extraction of competencies and provides a more reliable and accurate analysis as to whether the course syllabi teach the competencies that are required in the respective jobs.

By generating embeddings of missing competencies and the educational course syllabi, and performing a similarity measurement thereon, the platform is able to provide a recommendation as to which course would be best suited for being able to teach the respective desired competency that is missing from the existing course syllabi.

The user input may be via a human-machine user interface. The human-machine user interface may be a text box on a computer screen. The educational study identification may be the name of a target major or university degree.

The extracting of a set of job postings from an online database that corresponds to the educational study identification may comprise matching the user input to text within the job postings. In embodiments, the set of job postings may be tagged with a study identifier. The tagging may be based on keywords related to the educational study identification. The extracting of the set of job postings may comprise matching the educational study identification with the study identifier tag, and extracting the job postings where there is a match.

The competencies dictionary may comprise a soft skills dictionary and a technical skills dictionary.

Soft skills may be understood to be skills that comprise interpersonal skills, or psychosocial skills, for example.

Technical skills may be understood to be skills that are specific to a particular area of academic study (such as coding skills, for example). Technical skills may be understood to be specialized knowledge and/or expertise required to perform a task.

Identifying the course competencies may comprise using rule-based matching. Identifying the course competencies may comprise using similarity matching. Identifying the course competencies may comprise using a pre-trained large language model (LLM). Identifying the course competencies may comprise using both rule-based matching and similarity matching. Identifying the course competencies may comprise using either rule-based matching and similarity matching, or using a pre-trained large language model (LLM).

Identifying the job competencies may comprise using rule-based matching. Identifying the job competencies may comprise using similarity matching. Identifying the job competencies may comprise using a pre-trained large language model (LLM). Identifying the job competencies may comprise using both rule-based matching and similarity matching. Identifying the job competencies may comprise using either rule-based matching and similarity matching, or using a pre-trained large language model (LLM).

In embodiments, the course competencies identified by the rule-based matching and the similarity matching may be combined to generate the course competencies dataset. In embodiments, the job competencies identified by the rule-based matching and the similarity matching may be combined to generate the job competencies dataset. In embodiments, the course competencies identified by the LLM may be used to generate the course competencies dataset. In embodiments, the job competencies identified by the LLM may be used to generate the job competencies dataset.

In embodiments, the user may have the option of selecting how the competencies are extracted. For example, the user may select rule-based matching, similarity matching, or both rule-based matching and similarity matching, with the corresponding course and job competencies datasets being a combination of the two matching techniques. The user may instead select using the LLM for matching, with the generated course and job competencies datasets being generated by the LLM.

The rule-based matching for generating the job competencies dataset and/or the course competencies dataset may be direct matching between terms within the educational course syllabus and/or the set of job postings, with terms within the competencies dictionary.

The similarity matching for generating the job competencies dataset and/or the course competencies dataset may comprise splitting terms within the educational course syllabus and/or the set of job postings into n-grams.

"N-grams" is a term known in the field of similarity matching, whereby the text string to be matched is split into consecutive characters.

The n-grams may comprise grams, bigrams, or trigrams.

The similarity matching may comprise stemming the n-grams and stemming the terms within the preconfigured competencies dictionary, and returning a match if the stemmed n-gram and the stemmed term within the preconfigured competencies dictionary are the same.

A similarity between the stemmed n-grams and the stemmed terms within the preconfigured competencies dictionary may be determined using a longest common subsequence approach; wherein a match is returned if the similarity is within a predetermined range.

A similarity between the n-grams and the terms within the preconfigured competencies dictionary may be determined using a longest common subsequence approach; wherein a match is returned when the similarity is within a predetermined range.

The predetermined range may be greater than or equal to 0.9. The predetermined range may be greater than or equal to 0.95. The predetermined range may be equal to 1.

The pre-trained LLM may be fine-tuned using the following steps: inputting labelled data, wherein the labels comprise tags corresponding to technical skills and soft skills; integrating the inputted labelled data with a pre-defined query, wherein the pre-defined query defines a task to be performed; creating a prompt for the LLM, the prompt comprising the labelled data and the pre-defined query; inputting the prompt into the LLM to fine-tune the LLM; and saving the fine-tuned pre-trained LLM.

The labels may comprise tags corresponding to general/academic terms.

The fine-tuning of the pre-trained LLM may comprise dividing the labelled data into training data and validation data, such that the LLM performance can be assessed.

By fine-tuning the LLM on labelled data, the model may learn the linguistic patterns that may be used in both job postings and course syllabi that corresponds to particular skills or competencies.

The labelled data may be labelled by human annotators.

By using human annotators to train the LLM, the LLM will be more likely to interpret the language that it is analysing in a "human-like" manner.

The labelled data may be extracted from unstructured text (such as job postings or educational course syllabi) using a second LLM, wherein the second LLM performs keyword extraction on the unstructured text.

Keyword extraction may be the extraction of words or phrases from the unstructured text.

The use of a second LLM to extract keywords from unstructured text enhances the efficiency of the matching, whereby a structured dataset is created of words or phrases that can then be analysed for classification/extraction purposes.

The second LLM may be a generative pre-trained transformer (GPT).

Mapping competencies within the course competencies dataset with competencies within the job competencies dataset may comprise using Jaccard similarity. Using Jaccard similarity may produce a Jaccard similarity value. A match between competencies within the course competencies dataset with competencies within the job competencies dataset may be determined if the Jaccard similarity value is within a predetermined Jaccard similarity range. The Jaccard similarity range may be greater than 0.5. The Jaccard similarity range may be greater than 0.6. The Jaccard similarity range may be greater than 0.7.

Mapping competencies within the course competencies dataset with competencies within the job competencies dataset may comprise rule-based mapping.

Mapping competencies within the course competencies dataset with competencies within the job competencies dataset may comprise dictionary-based mapping.

Mapping competencies within the course competencies dataset with competencies within the job competencies dataset may comprise transformer-based mapping. Transformer-based mapping may be used to extract word embeddings and then measure similarity between them.

Embeddings may be understood as numerical representation of words.

The embeddings may be generated using a stsb-ROBERTa-large model of the SentenceTransformer.

The embedding's similarity may be calculated using a cosine similarity score.

The predetermined range for the embeddings' similarity may be greater than or equal to 0.7. The predetermined range for the embeddings' similarity may be greater than or equal to 0.8.

Generating the missing competencies dataset may comprise comparing the list of common competencies with the job competencies dataset to generate the missing competencies dataset.

Within the step of outputting a recommended course dataset, generating the embeddings may comprise generating embeddings for both the educational course syllabi and the missing competencies dataset using a transformer-based model.

The transformer-based model may be a stsb-ROBERTa-large transformer-based model. Similarity between the embeddings may be measured using cosine similarity. The predetermined range may be greater than or equal to 0.4. The predetermined range may be between 0.5-0.7 (inclusive).

The transformer-based model may be a BERT-based transformer-based model. The BERT-based transformer model may be a DistilBERT transformer model. Similarity between the embeddings may be measured using cosine similarity. The predetermined range may be greater than or equal to 0.4. The predetermined range may be greater than or equal to 0.45. The predetermined range may be greater than or equal to 0.5.

According to a second aspect of the present disclosure, there is provided a platform for displaying, to a user, a set of recommended competencies for an identified educational course, on an interactive dashboard, the platform comprising: an input field configured to receive an input by a user comprising an educational study identification; a search module, the search module configured to retrieve a set of job postings from an online database that corresponds to the identified educational study, the search module also configured to retrieve one or more educational course syllabi that corresponds to the educational study identification; a competencies extraction module; a mapping module configured to map competencies within the course competencies dataset with competencies within the job competencies dataset to output a list of common competencies; a gap analysis module configured output a missing competencies dataset; a recommendation module configured to generate embeddings for both the educational course syllabi/competencies and the missing competencies dataset, measure similarity between the embeddings; and output at least one educational course syllabus whose competencies has a similarity within a predetermined range as a recommended course; and an interactive dashboard configured to display the outputs of at least one of the mapping module, the gap analysis module, or the recommendation module to the user.

The competencies extraction module comprises: a rule-based matching sub-module configured to receive the set of job postings and the educational course syllabus as input; a similarity based matching sub-module configured to receive the set of job postings and the educational course syllabus as input; and a machine learning based competencies extraction sub-module configured to receive the set of job postings and the educational course syllabus as input.

Each sub-module is configured to output course competencies and job competencies, the competencies extraction module being configured to output the course competencies and job competencies to generate a course competencies dataset and a job competencies dataset.

The mapping module may comprise one or more of: a rule-based mapping sub-module; a dictionary-based mapping sub-module; a transformer-based sub-module; and/or a similarity-based mapping sub-module.

The gap analysis module may compare the list of common competencies with the job competencies dataset to output the missing competencies dataset.

The similarity-based sub-module may use Jaccard similarity.

The similarity measured by the recommendation module may be transformer-based similarity.

The embeddings generated by the recommendation module may be generated using a DistilBERT model.

According to a third aspect of the present disclosure, there is provided one or more non-transitory computer-readable storage media storing instructions which, when executed by a computer, cause the computer to perform the method of the first aspect.

It will be understood that features described in relation to one aspect of the present disclosure may be applicable to another aspect of the present disclosure, and vice versa.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

The foregoing and other objects, features and advantages of the present invention, as well as the invention itself, will be more fully understood from the following description of preferred embodiments, when read together with the accompanying drawings.

DETAILED DESCRIPTION

The present disclosure relates to the field of competencies gap analysis, and more particularly to an automated, hybrid approach to competencies gap analysis.

The principles of the present invention and their advantages are best understood by referring to FIG. 1 to FIG. 10. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1:
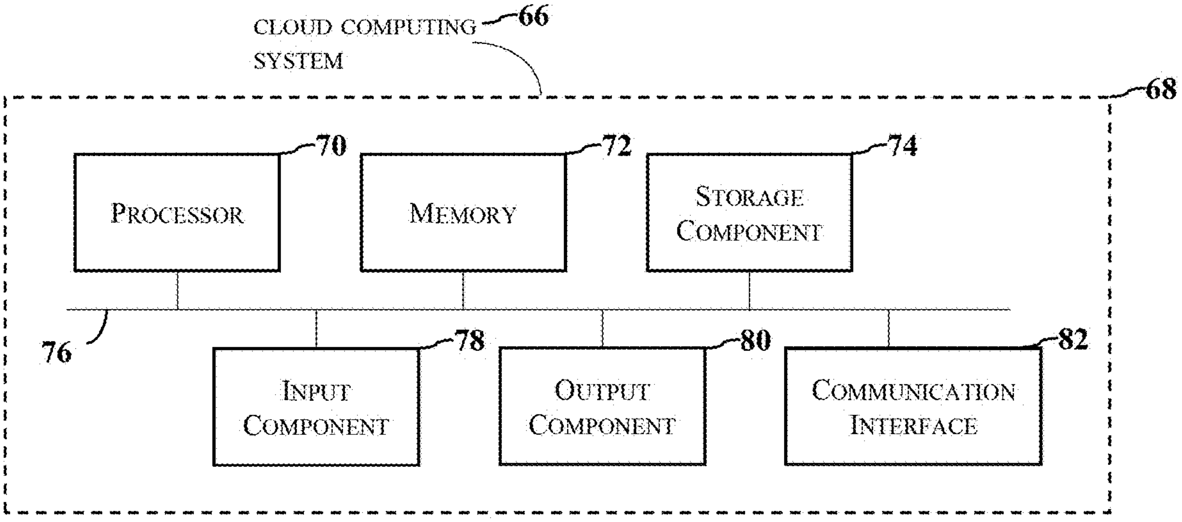
FIG. 1 shows a platform according to an embodiment of the present disclosure.

FIG. 1 shows a platform according to an embodiment of the present disclosure.

A diagram of a platform 68 where systems and/or methods described herein may be implemented. As shown in FIG. 1, the platform 68 may execute within a cloud computing system 66. The cloud computing system 66 includes one or more elements 70-82. The platform 68 includes a processor 70, a memory 72, storage 74, a networking component 76, a user device (input component 78 and output component 80), and a communication interface 80. The cloud computing system 66 includes computing hardware.

In embodiments, the user device includes computer peripherals such as a keyboard and mouse. The output component may include a computer monitor.

Figure 2:
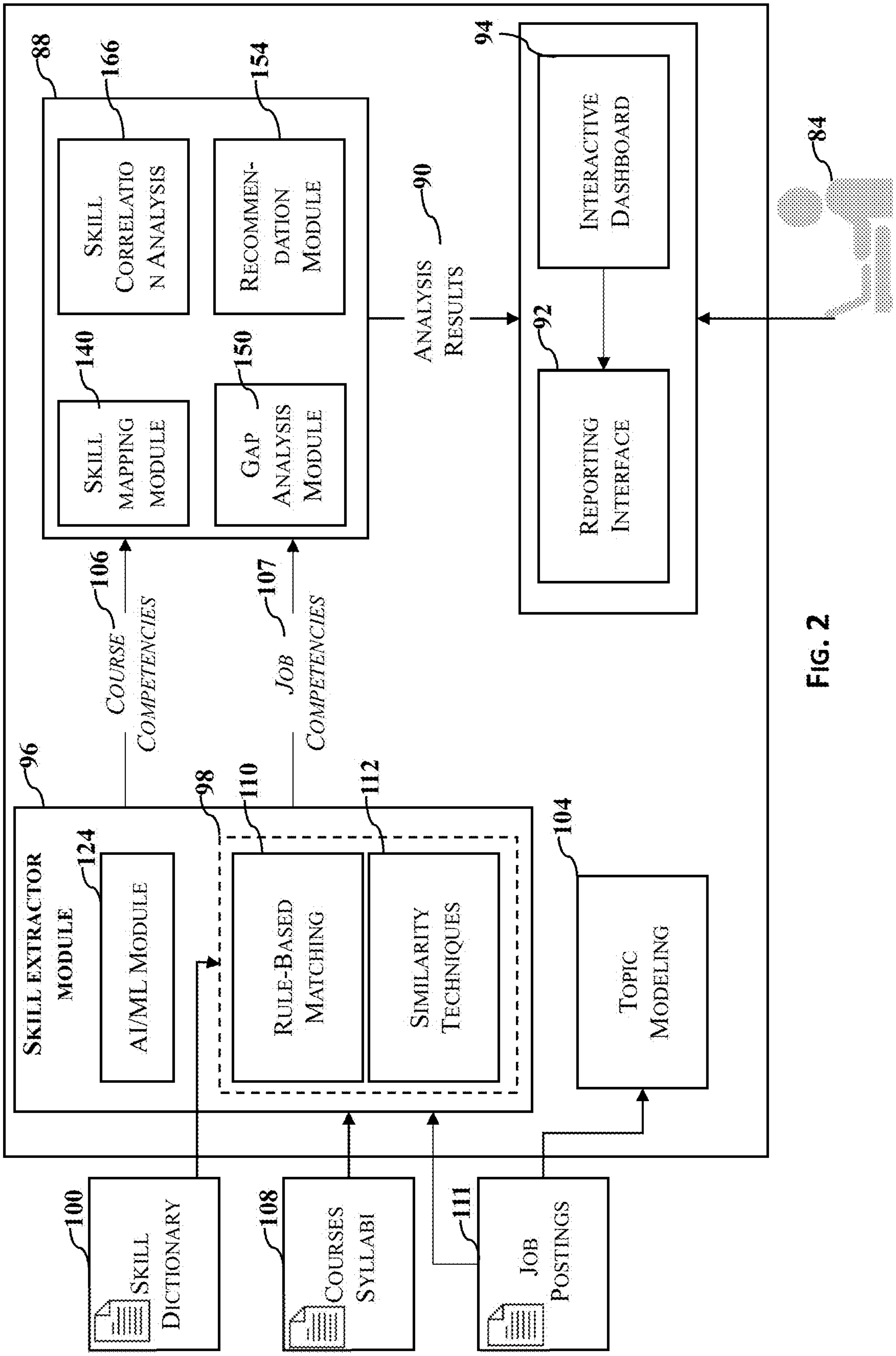
FIG. 2 shows a system comprising modules according to an embodiment of the present disclosure.

FIG. 2 shows a system comprising modules according to an embodiment of the present disclosure.

At a high-level, the system according to embodiments of the present disclosure performs competencies extraction from jobs and university courses and applies competencies mapping analysis and competencies gap analysis between the acquired university competencies and the job demanded competencies to identify the demanded competencies that are acquired in the university and highlight the missing job competencies that are not offered in the university courses. After the job competencies that are missing in the courses are identified, a recommendation module is provided giving a suggestion to include certain missing job competency in specific course(s) so that such competency can be taught to students in this course(s). This system will be described in more detail in relation to FIG. 2, below.

The system receives inputs comprising a Skill Dictionary 100, courses syllabi 108, and job postings 111.

The first stage of the process is competencies extraction. The term "skills" and "competencies" may be used interchangeably. Competencies extraction is performed by the skill extractor module 96.

Competencies need to be extracted from data sources and standardized/arranged such that meaningful analysis can take place on the data gathered. The data sources may sometimes be unstructured data, so that unstructured data needs to be treated so that it can be interpreted and categorized appropriately.

To extract technical course competencies from courses and technical job competencies from jobs in each of the targeted educational studies (or, in embodiments, majors), a dictionary of technical competencies is gathered for every different major. In embodiments, certain courses or educational studies (or majors) may have a plurality of dictionaries. For example, in a cyber security major, a separate dictionary can be collected for technical security competencies and another dictionary can be dedicated for technical non-security competencies. In the cyber security major, the acquired certificates in courses and the demanded certificates in jobs are also investigated through the usage of a cyber-security certificates dictionary.

Examples of technical competencies dictionaries for specific areas of educational study (majors) are provided.

Technical competencies dictionary of data science major: The dictionary of technical data science competencies was collected from various sources which include data science university course descriptions, ONET website, Udacity data career checklist, and other data science career websites. These sources yielded a list of relevant data science skills. To further enhance this dictionary, additional technical skills were obtained through the use of an LLM. In this example, GPT-3.5-Turbo model; one of OpenAI's advanced language models, was used.

Technical competencies dictionary of sustainability major: sustainability-related competencies were obtained from the Global Green skills Report. Additional sustainability-related competencies were also obtained from the GPT-3.5-Turbo model.

Technical competencies dictionary of cyber security major: The dictionary of security-related competencies was gathered from well-known resources such as SANS, National Institute of Standards and Technology (NIST), National Initiative for Cybersecurity Careers and Studies (NICCS), Australian Signals Directorate (ASD), and the UK Cyber Security Council. Also, a list of cyber security terms was also considered from literature such as "A Dictionary of Information Security Terms, Abbreviations, and Acronyms"

book. Moreover, a list of computer science-related terms was included in this dictionary from the "A Dictionary of Computer Science Book" (Oxford University).

The dictionary of technical computer science (non-security) competencies was created from reliable resources which include literature such as "A Dictionary of Computer Science Book" (Oxford University), and an IGCSE Computer Science Glossary. Additional computer science terms were obtained from computer science terms provided by universities such as University of Idaho, and University of Edinburgh. This dictionary also consists of data science terms from the data science glossary. A dictionary of certificates was also created by collecting a list of cyber security-related certificates from online resources.

A soft competencies dictionary is also collected to extract soft competencies in the courses and jobs in every targeted educational study. The soft competencies dictionary was collected from reliable university course descriptions and multiple well-known websites like ESCO (European Skills, Competences, Qualifications and Occupations) and ONET. Additional soft skills were also obtained using GPT-3.5-Turbo model and added to the dictionary.

An additional competencies abbreviations dictionary was also created, wherein within each major, the abbreviations that represent competencies were placed in separate abbreviations dictionary file and not in the competencies dictionary.

This combination of technical skills dictionary 102 and soft skills dictionary 104 make up the "skill dictionary" 100.

In embodiments, the combination of technical skills dictionary, soft skills dictionary, and abbreviations dictionary make up the skill dictionary.

For every educational study (major), jobs were crawled from online job portal/platform by specifying the targeted major as the job title and a geographical location as the job location. In embodiments, the United Arab Emirates was selected as the job location, if the educational study is based in the United Arab Emirates. In embodiments, the geographical location may match the educational study location.

The crawled jobs, for each major, are stored in a CSV file. These collected jobs are the original default jobs 111. For example, in the data science major, jobs were crawled by setting the job title to data science, in sustainability major, the job title was set to sustainability, and, in cyber security, cybersecurity was inputted as a job title. In all majors, the job location was set to United Arab Emirates when crawling these jobs. To do this, an automated online job portal/platform crawler was built.

Course syllabi 108 of every targeted major were collected from a university and stored in a CSV file. A PDF crawler was also built for this purpose. Cyber security course syllabi were obtained from the Bachelor of Science in Information Technology (Concentration in Security and Network Technologies) Program of Zayed University, for example. For data science major, course syllabi were collected from the Bachelor of Science in Data Science Program of two different top-ranked universities; Tilburg University and Stanford University. Sustainability course syllabi were gathered from the Bachelor of Science in Sustainability and Environment of University Technology Sydney (UTS).

In embodiments, the course syllabi are collected from the university for which the analysis would be performed and implemented. For example, the recommendation provided by the analysis of the platform would be provided to the educational institution for which the course syllabi belong.

These three inputs (skill dictionary 100, courses syllabi 108, and job postings 111) are fed to the skill extractor module subset 98, which either generates competencies based on rule-based techniques 110 or similarity-based techniques 112. The AL/ML module 124 which is based on pre-trained LLM takes only courses syllabi 108 and job postings 111 as inputs to generate course 106 and job 107 competencies. Job postings 111 are also considered input to the topic modeling module 104, which studies the different topics in specific job markets. Job 107 and course 106 competencies are considered inputs for the analysis module 88. The skill mapping module 140 results in a list of common skills between job and course competencies 106, while the gap analysis module 150 results in a list of skills missing in courses, which, in turn, the recommendation module 154 returns a list of recommended skills, which are missing in the courses to be added. The skill correlation analysis 166 plays a role as it shows how related competencies are in specific job markets. It returns the highly correlated demanded skills in a specific job market. The results of the analysis module 88 are analyzed and represented 90 through an interactive dashboard 94 and reporting interface 92. User 84 is capable of visualizing and analyzing the analysis results 90.

The visualization of the results may comprise charts. The charts may comprise Sankey diagrams.

Further details of the modules are provided in the following figures.

Figure 3:
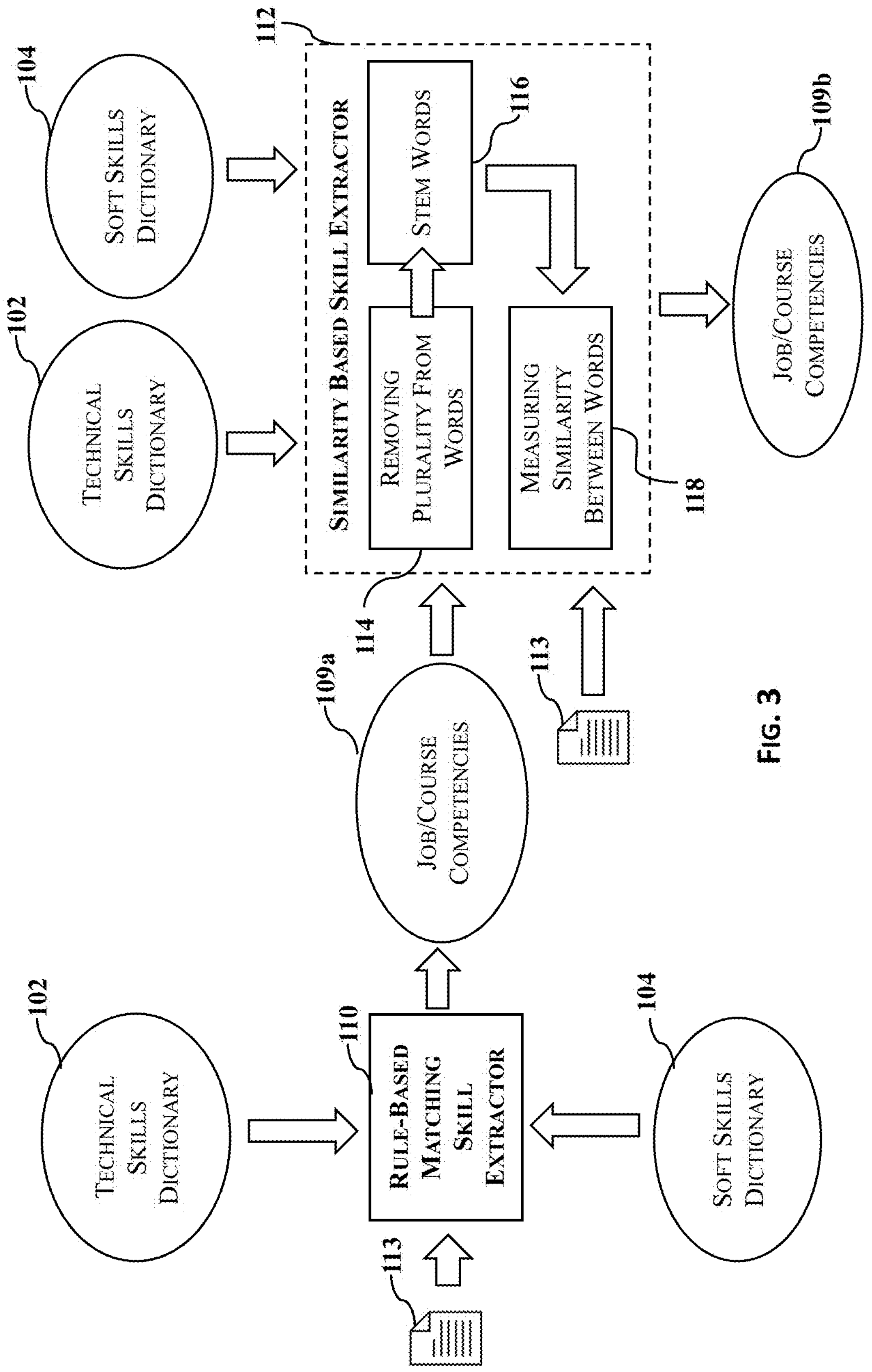
FIG. 3 shows steps for competencies extraction according to an embodiment of the present disclosure.

FIG. 3 shows steps for competencies extraction according to an embodiment of the present disclosure.

The rule-based matching skill extractor 110 takes the combination of job postings/courses syllabi 113 as input in addition to technical skills 102 and soft skills 104 dictionaries. This module 110 returns a list of job/course competencies 109*a*. The job/course competencies comprises job competencies 107 and course competencies 106. The rule-based matching is performed by using direct matching relying on the predefined dictionaries of competencies.

The similarity-based skill extractor 112 takes the job postings/courses syllabi 113 and the soft skills 104 and technical skills 102 dictionaries as input. It also takes the job/course competencies 109*a* as input in order to merge them with its output. The similarity-based extractor 112 depends on three stages: removing the plurality from words 114, stemming words 116, and measuring the similarity between words 118. The output from this stage is the full job/course competencies 109*b*.

This natural language processing-based similarity analysis 112 is performed by tokenizing each of the targeted job descriptions 111 to grams, bigrams, and trigrams. In each job description 111 of the considered jobs, each of the dictionary competencies that were not found or missing in this job will be compared to each n-gram term of this job to check if any of the job n-gram term and any of the missing dictionary competencies are similar.

First, in each job, each of the missing dictionary competencies in this job will be compared to each n-gram term in this job to check if they are the same after removing the plural letter "s" (removing the plurality from words 114). If so, then this dictionary competency term will be detected as a job competency in this job. If not, the n-gram term and the missing dictionary of competencies in this job will undergo go stemming 116 to check if they are the same after stemming was performed. If not, then the similarity between words will be measured 118 using Longest Common Subsequence (LCS). LCS will be applied on the n-gram term and the missing dictionary competency. If they score a similarity value above 0.9, this dictionary competency will be considered a demanded job competency. LCS technique allows the identification if two words have matching characters by reflecting the length of the longest subsequence (not necessarily consecutive) that appears in both words.

The LCS technique focuses on finding the longest sequence that two strings have in common. It checks how similar the strings are by comparing characters and therefore looking at the longest sequence of letters they both share. A similarity score may be determined by dividing the length of this longest shared part by the length of the longer string.

All these extracted job competencies (based on direct matching and similarity analysis) will be obtained and output. The number of jobs that each of these extracted job competencies appeared in will be computed to obtain the highly demanded competencies.

The same process of direct matching 110 and similarity analysis 112 is performed on the course syllabi (course title, course descriptions, and the course learning outcomes, (and course topics in cyber security major)) using the dictionary of competencies to extract the competencies acquired in each of the courses.

The combination of the job and course competencies generated by the extraction stages 110, 112 are output as job/course competencies 109*b*.

Figure 4:
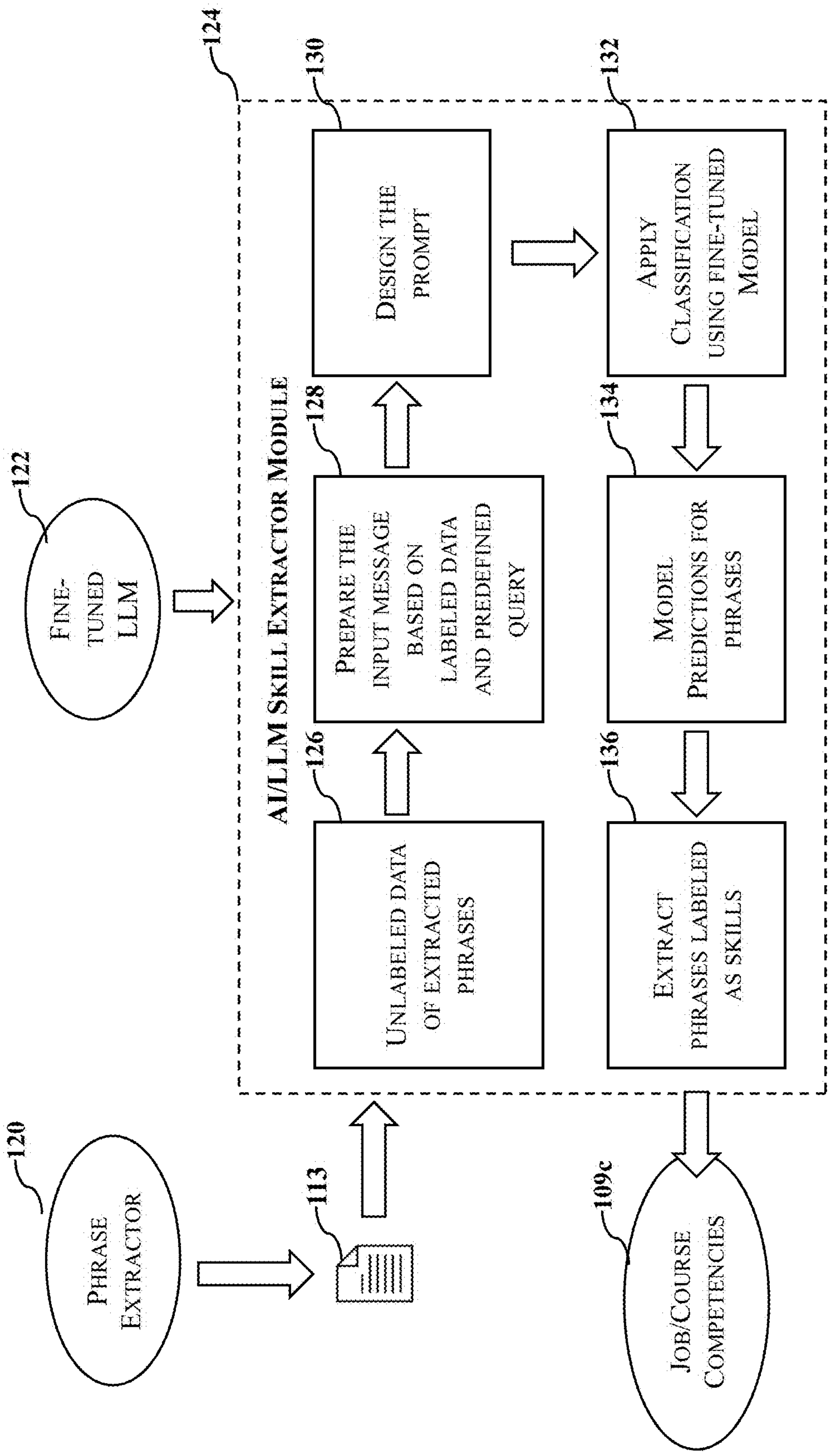
FIG. 4 shows AI/LLM competencies extraction according to an embodiment of the present disclosure.

FIG. 4 shows AI/ML competencies extraction based on pre-trained LLM according to an embodiment of the present disclosure.

The fine-tuned model 122 serves as a basis for extracting skills from course syllabi and job postings 108, which contain unstructured text. Structured phrases are first extracted 120 from the unstructured data in the job postings/course syllabi 113 to enable the fine-tuned model 122 to extract relevant phrases effectively. This process involves preparing and obtaining structured, unlabeled data 126 for testing the model's capabilities. The unlabeled data 126 comprising extracted phrases is then integrated with a query 128 outlining the fine-tuned model's requirements. This merging of data and query ensures that the model is appropriately directed towards the task at hand, enhancing its accuracy and relevance in skill extraction. Then, the prompt is designed 130. With the structured data and query in place, the saved fine-tuned model is called to process the unlabeled data as input. By leveraging the fine-tuned model's learned parameters and capabilities, this step facilitates the extraction of meaningful insights from the provided data. Utilizing the input query and the integrated data, the fine-tuned model classifies the input data 132 and generates predictions regarding the relevant skills present within the input text 134. These predictions 134 serve as valuable outputs, guiding subsequent actions such as skill mapping, gap analysis, and recommendation. Then, skills are extracted 136 from predictions. The final output of the AI/ML skill extractor module 124 is the job/course competencies 109*c*.

In embodiments, the AI/ML competencies extraction based on a pre-trained LLM receives and parses job postings. In embodiments, the AI/ML competencies extraction extracts and compiles a list of phrases from the job postings. In embodiments, the LLM is used to predict and assign labels to each phrase. In embodiments, the phrases that are filtered as a function of their assigned labels. In embodiments, the phrases are filtered on soft or technical skills. In embodiments, the user specifies a skill type, and competencies labelled with that skill type are output to the user. In embodiments, the obtained set of competencies correspond to demanded competencies within a target job market. In embodiments, the most demanded obtained competencies for the target job market type are visualized through at least one interactive dashboard.

Figure 5:
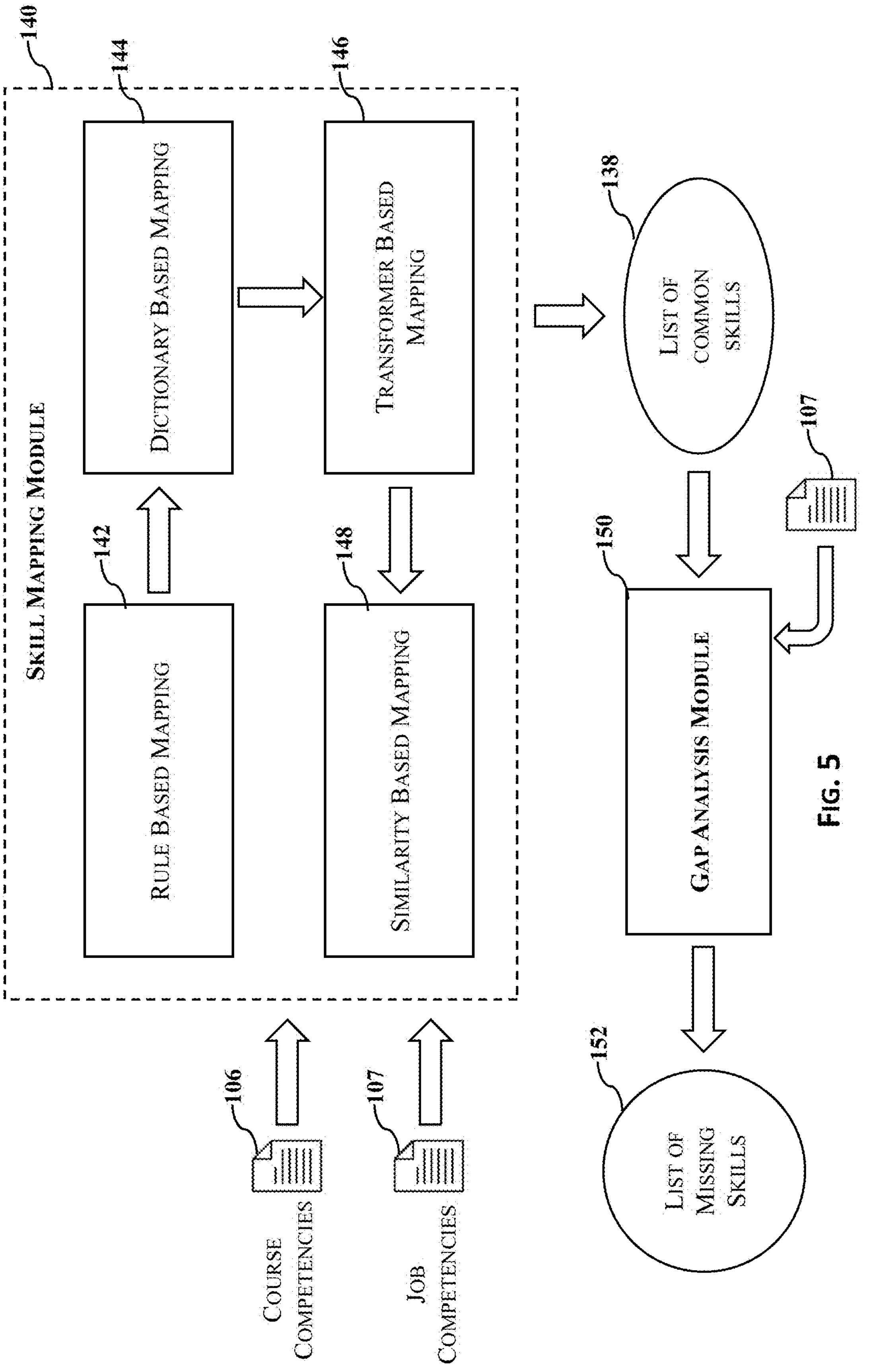
FIG. 5 shows a skill mapping module and gap analysis module according to an embodiment of the present disclosure.

FIG. 5 shows a skill mapping module and gap analysis module according to an embodiment of the present disclosure.

This skill mapping module 140 is a further detailed description of the skill mapping module 140 in FIG. 2.

The skill mapping module 140 takes the job 107 and course 106 competencies as input. Rule-based mapping 142 is applied to competencies 106 to generate a list of common skills. Rule-based mapping may comprise direct matching between the job competencies 107 and the course competencies 106 to determine the directly matching competencies that are demanded in the job marked and acquired in the courses.

Then dictionary-based mapping 144 is also applied to competencies 106, 107 to generate a list of common skills. Further, transformer-based mapping 146 and similarity-based mapping 148 are used to generate lists of common skills. The output is the list of all common skills 138 generated through the whole process 140. Based on the list of common skills 138, and the job competencies 106, gap analysis 150 is applied to generate a list of missing skills 152.

The dictionary-based mapping 144 may comprise WordNet similarity, for example.

WordNet similarity may be applied to the resulting missing job competencies and all the extracted course competencies to find job competencies that are similar to the extracted course competencies of each course in terms of synonyms and hypernyms. WordNet is a lexical database of semantic relations between words that links words into semantic relations including synonyms, hyponyms, and hypernyms. A hypernym is a broader word that encompasses more specific words. Hypernyms are words that have a more general meaning than other words. For example, the words "dog" and "cat" are hyponyms of the word "animal".

Using WordNet, the synonyms of the missing job competencies are obtained. After that, for every course, it is checked to determine if the synonym of each of the missing job competencies is found in the extracted course competencies of this course. If the synonym of a missing job competency is found in the extracted course competencies of a course, then this job competency will be considered as job competency that is similar to the extracted course competencies of this course. Thus, this job competency will be considered as an acquired competency in this course. Then, the remaining missing job competencies will be fed to the WordNet to obtain their hypernyms. If the hypernym of a missing job competency is found in the extracted course competencies of a course, then this job competency will be considered as job competency that is similar to the extracted course competencies of this course. Thus, this job competency will be considered as an acquired competency in this course.

Remaining missing demanded job competencies in the courses can be identified (job competencies that were not acquired in any of the courses considering both direct matching and WordNet similarity). Additional similarity detection using Jaccard similarity 148 and the transformer-based (AI-based) techniques 146 will be used to find similar competencies between each pair of competencies from the obtained missing demanded job competencies and the extracted course competencies in the courses.

The Jaccard similarity coefficient between two terms represents the value of division between the number of common words in the set of terms and the number of unique words in these two terms. Each pair of missing demanded job competencies and course competencies having a Jaccard similarity value of 0.5 or higher are considered similar. In this case, these job competencies that were found similar to the course competencies of a certain course(s) will be considered as acquired competencies in the respective course(s).

As for transformer-based similarity technique 146; a transformer model is a deep learning (AI) model that relies on attention mechanisms to learn the semantic characteristics of words in the embeddings. After that, embeddings are obtained through the transformer model; the cosine similarity computes the similarity among word embeddings in order to measure the semantic similarity. In other words, cosine similarity calculates the similarity among two vectors of an inner product space using cosine of the angle of two vectors identifying whether two vectors are directing in roughly the same direction.

In this system, the transformer-based similarity technique works by generating an embedding of each considered missing job competency and each course competency pair using the 'stsb-ROBERTa-large' model of the Sentence-Transformer. Then, the cosine similarity score of the embedding of each pair of missing job competency (job competency that was not acquired in any of the courses considering both direct matching and WordNet similarity) and extracted course competency will be computed. Competencies' pairs having a cosine similarity value of 0.7 or higher are considered similar. Similarly, in this case, these job competencies that were found similar to the course competencies of a certain course(s) will be considered as acquired competencies in the respective course(s).

In embodiments of the present disclosure, one or more of the mapping techniques may be used in the skill mapping module. In embodiments, the skill mapping module comprises a combination of one or more of either rule-based mapping, dictionary-based mapping, transformer-based mapping, or similarity-based mapping.

The gap analysis module 150 is described in more detail below.

Different gap analysis schemes are provided to highlight a competencies gap between the educational study (university program) and the job market demand.

Courses x Job Matrix for Demanded Competencies:

In embodiments, the gap analysis module 150 can output a matrix showing the list of demanded job competencies in the jobs versus the course titles (in the selected major and university) revealing the demanded job competencies that are acquired in each course and the missing (not-acquired) demanded job competencies in these courses.

In embodiments, the user is able to choose direct matching, WordNet, Jaccard Similarity, Transformer-based similarity technique, or complete competencies mapping (all these latter mapping techniques), any combination of mapping techniques, before constructing this matrix. For instance, if the user chooses direct matching, then the demanded job competencies that directly matched with the extracted course competencies in a course will be considered as acquired competencies in this course while the remaining job competencies will be considered as missing job competencies in this course. Likewise, if WordNet similarity is chosen by the user, the demanded job competencies that showed similarity with the extracted course competencies in a course based on WordNet will be considered as acquired competencies in this course whereas the remaining job competencies will be identified as missing job competencies in this course.

Courses x Job Matrix for Acquired Competencies:

In embodiments, the gap analysis module 150 can output a matrix of the course titles versus the extracted course competencies revealing the course competencies that are demanded or not demanded by the job market. In embodiments, the user able to choose direct matching, WordNet, Jaccard Similarity, Transformer-based similarity technique, or complete competencies mapping before constructing this matrix. For example, if direct matching is chosen by the user, the extracted course competencies of each of the courses that directly match with the job competencies will be considered as demanded course competencies in the course. In each course, the rest of the extracted course competencies in this course that did not match with the demanded job competencies will be considered as non-demanded course competencies. Similarly, if WordNet similarity is selected by the user, the list of course competencies in this course that showed similarity with the demanded job competencies based on WordNet will be considered as demanded course competencies. And for each course, the remaining extracted course competencies in this course that did not show similarity with the demanded job competencies based on the WordNet will be considered as non-demanded course competencies.

Most Demanded Missing Competencies:

Based on the chosen mapping technique (direct matching, WordNet, Jaccard Similarity, Transformer-based similarity technique, or complete competencies mapping, or any combination of techniques), the demanded job competencies acquired in the courses and the missing (not acquired in the courses) job competencies are determined. A chart of the percentage of demanded job competencies in that are acquired in the courses relying on the selected mapping technique (direct matching, WordNet, Jaccard Similarity, Transformer-based similarity technique, or complete competencies mapping, or any combination of techniques) and the percentage of demanded job competencies that missing in these courses is shown. A chart of the most demanded missing job competencies in these courses is illustrated. The chart may be a pie chart. The chart may be a donut chart. The most demanded job competencies are identified based on the number of jobs each unique competency appears in.

Non-demanded Acquired Competencies:

Based on the chosen mapping technique (direct matching, WordNet, Jaccard Similarity, Transformer-based similarity technique, or complete competencies mapping, or any combination of techniques), the course competencies that are demanded in the job market are determined. A chart of the percentage of course competencies that are acquired in the targeted courses and are demanded in the targeted jobs and the percentage of course competencies that are acquired in these courses but are not demanded in the targeted jobs is plotted. The number of courses that each of the extracted course competencies appear in is computed then a chart of the top course competencies that are acquired or taught in courses but not demanded by the job market is exhibited. The chart may be a pie chart. The chart may be a donut chart.

Figure 6:
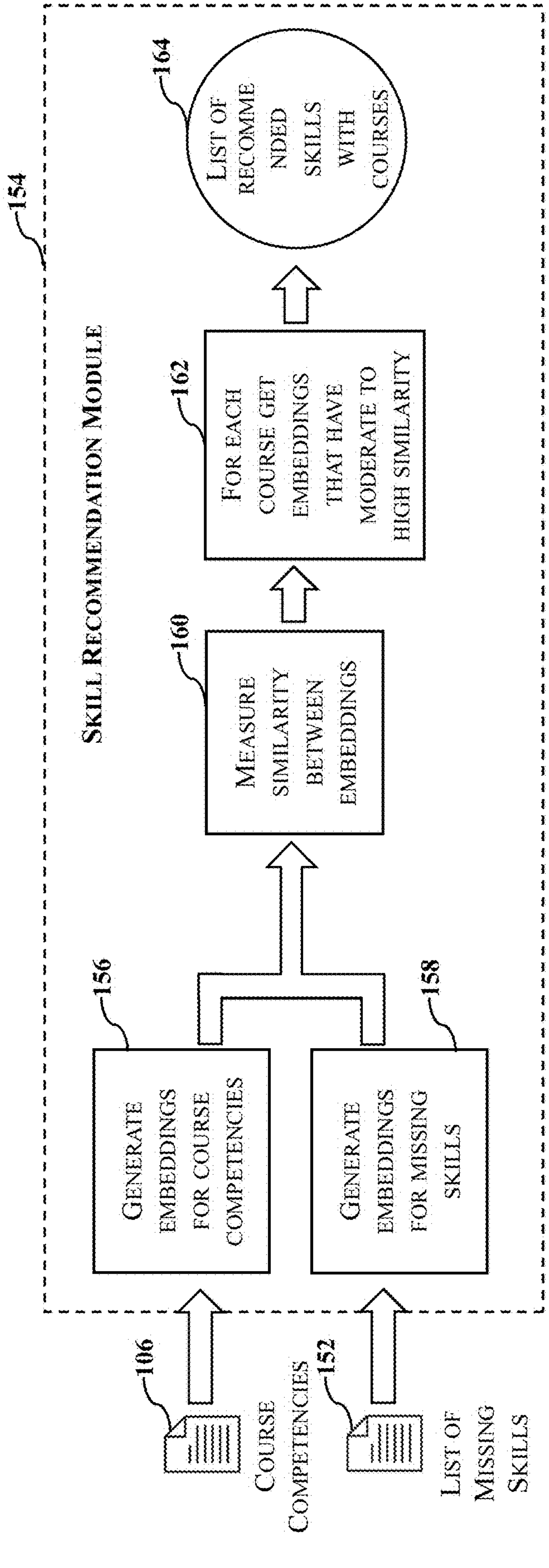
FIG. 6 shows a skill recommendation module according to an embodiment of the present disclosure.

FIG. 6 shows a skill recommendation module according to an embodiment of the present disclosure.

The missing job competencies 152 in any of the courses are identified. A recommendation module 154 provides a recommendation to include certain missing job competency(ies) in specific course(s) so that such competency(ies) can be taught to students in this course(s).

The skill recommendation module 154 inputs the course competencies 106 and the list of missing skills 152. Each of these competencies is transformed into embeddings 156 and 158. Then, these embeddings are compared to measure the similarity between them 160, and for each missing job competency that carries a similarity between 0.5 and 0.7 with course competencies, is returned 162, and a list of recommended skills with courses is returned 164. More detail is provided on the recommendation module process:

In embodiments, a stsb-ROBERTa-large model is used in the recommendation module 154. In embodiments, a Distil-BERT model is used in the recommendation module 154. In embodiments, the user is able to choose between one of the transformer-based models, either stsb-ROBERTa-large or Distil-Bert model.

If the user selects the 'stsb-ROBERTa-large' transformer-based (AI-based) recommendation module of the Sentence-Transformer mentioned above, embedding of each missing job competency and each course competency pair will be generated. As previously described, a transformer model is a deep learning (AI) model that relies on attention mechanisms to learn the semantic characteristics of words in the embeddings. Once embeddings are produced, the cosine similarity score of the embedding of each pair of competencies will be computed. Competencies' pairs having a cosine similarity value ranging between 0.5 and 0.7 are considered for the recommendation module. The courses that belong to course competencies that revealed cosine similarity value ranging between 0.5 and 0.7 with any of the missing job competencies will be considered as the recommended courses. A table will be plotted showing each of the recommended course titles each with its corresponding missing job competencies relying on the cosine similarity value (ranging between 0.5 and 0.7). A diagram of the courses, course competencies, and missing job competencies that revealed cosine similarity ranging between 0.5 and 0.7 is also plotted. The diagram may be a Sankey diagram.

If the user selects the BERT-based (also a transformer-based AI technique) recommendation model, the course descriptions and learning outcomes of the considered courses with be tokenized and embeddings with be generated from the course terms using the Distil-BERT model and tokenizer. In such embodiments, the input may not be course competencies 106 but may instead be course syllabi 108. Embeddings are produced from the missing job competences using the Distil-BERT model. Then, the cosine similarity score of each course and missing job competencies embedding pair will be computed. Each pair having a cosine similarity value above 0.4 is considered for the recommendation module. The courses that belong to course embedding that revealed cosine similarity with certain missing job competency will be considered as the recommended courses for this missing job competency. A table will then be plotted showing each recommended course title with its corresponding missing job competencies.

Figure 7:
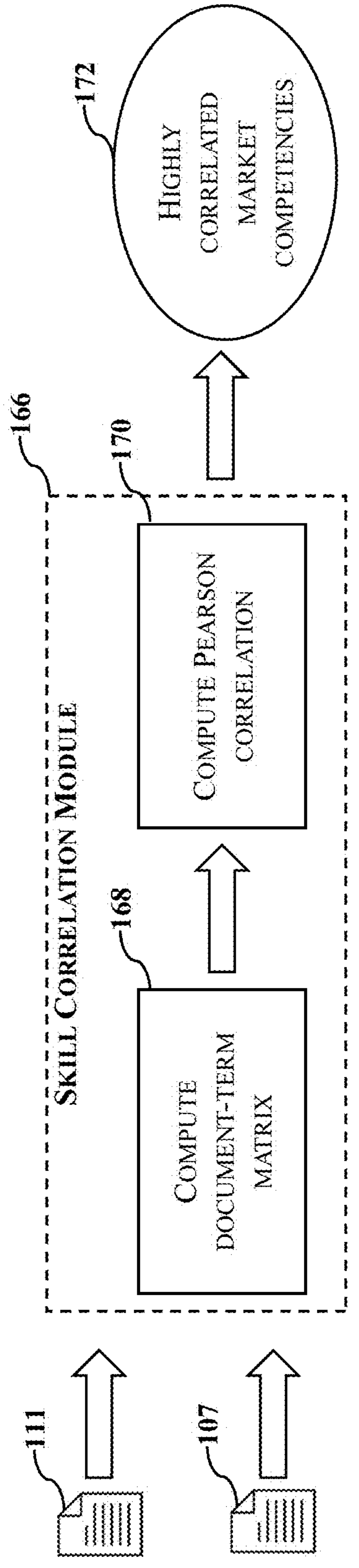
FIG. 7 shows a skill correlation module according to an embodiment of the present disclosure.

FIG. 7 shows a skill correlation module according to an embodiment of the present disclosure.

The skill correlation module 166 takes the job postings 111 and job competencies 107 as input to compute the document-term matrix 168. A document term matrix is a matrix that represents the frequency with which each term appears within a document(s) pair. Then, the Pearson correlation 170 is computed between skills to generate the highly correlated market competencies 172. This can be used to identify which competencies are highly desired by the job market.

Figure 8:
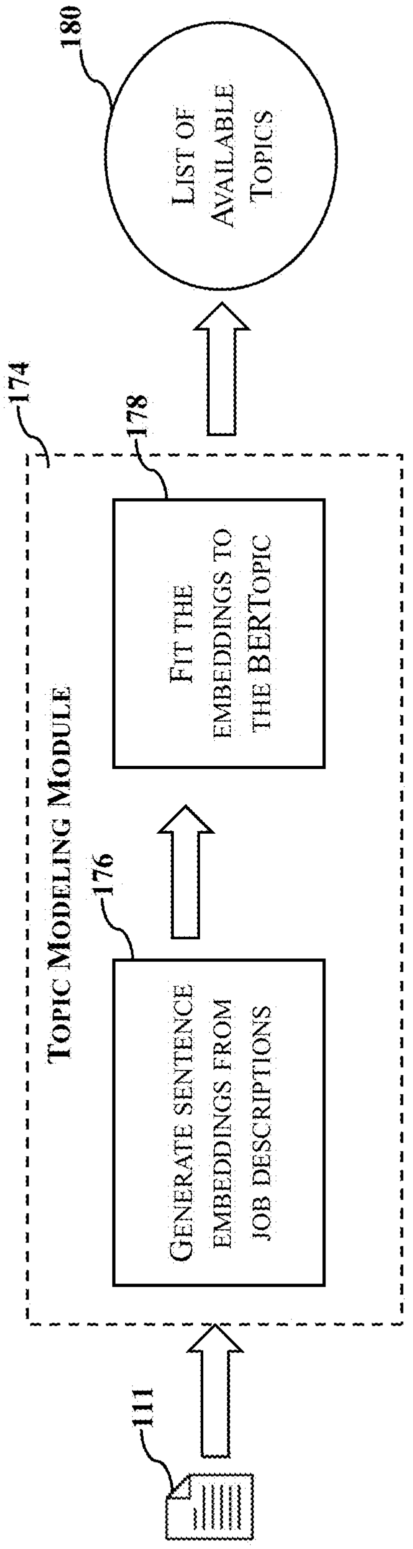
FIG. 8 shows a topic modeling module according to an embodiment of the present disclosure.

FIG. 8 shows a topic modeling module according to an embodiment of the present disclosure.

The topic modeling module 174 takes the job postings 111 as input to generate embeddings 176 and feed these embeddings to BERTopic model 178 to generate a list of available topics 180.

Topic modeling may be performed on the job descriptions of the considered jobs to determine the different topic in them through the use of BERTopic.

First, sentence embeddings will be generated from the job descriptions of the considered jobs by applying the encode method of the SentenceTransformer class and a model from the sentence-transformers library. In embodiments, the 'all-MiniLM-L6-v2' model from the sentence-transformers library is used. After that, the job descriptions and the generated embeddings will be fitted and transformed to the BERTopic model. The BERTopic model works in a guided way by taking a seed list of topics.

Figure 9:
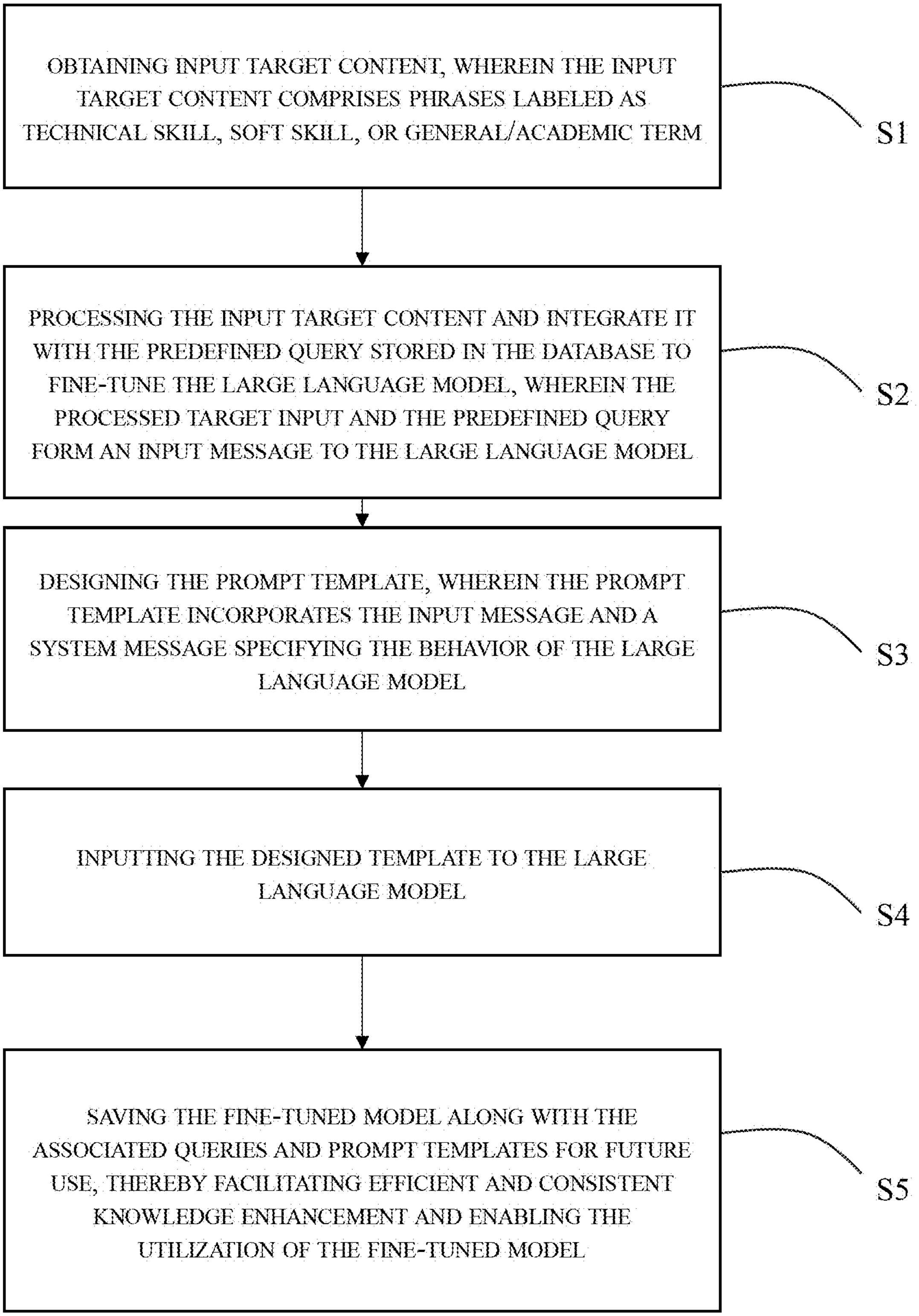
FIG. 9 shows the sequential steps through a flowchart for fine-tuning an LLM according to an embodiment of the present disclosure.

FIG. 9 shows the sequential steps through a flowchart for fine-tuning an LLM according to an embodiment of the present disclosure.

This AI/ML module based on pre-trained LLM is designed to extract both soft and technical skills from job postings and course syllabi.

These steps are outlined below:

[S1] Extraction and Transformation: External job postings are collected and transformed into structured text, capturing phrases and corresponding labels. These phrases encompass soft skills, technical skills, and job-specific terms such as "salary." The extracted data is saved for utilization in fine-tuning the large language model (LLM), marking the initial step in the process.

[S2] Preprocessing and Query Preparation: The collected data undergoes preprocessing and preparation to enable its use in fine-tuning. A query describing the fine-tuning task is formulated and stored as part of this step. The processed input is then merged with the query to create the input message required for fine-tuning.

[S3] Prompt Design and System Message Incorporation: A prompt is crafted to include a system message detailing the model's behavior. This prompt and the input message are integrated into the LLM to guide its fine-tuning process effectively.

[S4] Inputting Prompt Template: The designed prompt template is fed into the LLM to initiate fine-tuning, enabling the model to adapt to the specific task described in the query and structured input data.

[S5] Saving the Fine-Tuned Model: Upon completion of the fine-tuning process, the resulting model is saved along with the prompt template. This facilitates future utilization of the fine-tuned model and streamlines the enhancement of subsequent fine-tuning endeavors.

Figure 10:
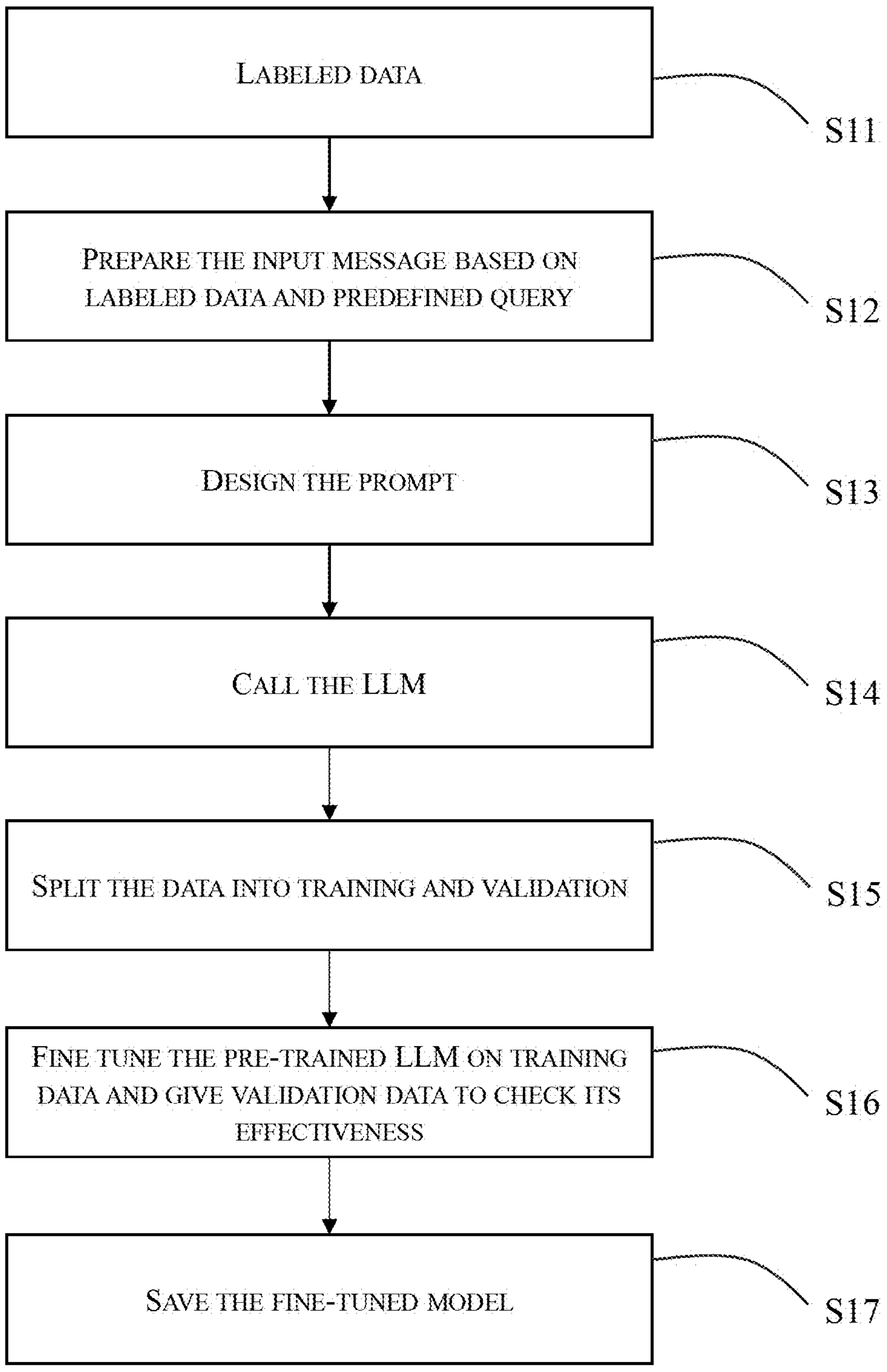
FIG. 10 summarizes the methodology pathway through a schematic for enabling a pre-trained LLM to acquire linguistic patterns according to an embodiment of the present disclosure.

FIG. 10 summarizes the methodology pathway through a schematic for enabling a pre-trained LLM to acquire linguistic patterns according to an embodiment of the present disclosure.

The fine-tuning process aims to enhance the performance of a pre-trained LLM. The first step is obtaining the labeled data [S11], which plays an essential role in the fine-tuning process.

In embodiments, the LLM leverages the pre-trained Mistral 7B large language model, having capability in skill classification. However, since job postings and course syllabi typically consist of unstructured text, they need to be converted into structured data for the Mistral 7B model to classify skills effectively.

Initially, external job postings are gathered to serve as a basis for fine-tuning the Large Language Model (LLM), making it more suitable for the task of skill classification.

Key phrases are extracted from the job descriptions to create meaningful structured data using an unsupervised technique. The key phrase extraction technique involved inputting the job descriptions into GPT-3.5-turbo to perform keyword extraction. The resulting phrases are saved in a CSV file.

In embodiments, these extracted phrases may be labeled by four human annotators with diverse backgrounds.

The job description typically includes various sections such as company background, job role explanation, benefits, salary details, contract terms and qualifications, certificates, academic background, and skills. Consequently, the phrases extracted from these descriptions carry three distinct labels: technical skills, soft skills, and general/academic terms.

Then, the data undergoes preparation and merging [S12] with a task-descriptive query to allow the LLM to understand the task at hand.

This comprises formalizing and preparing the data to serve as input for the LLM. The input to the LLM consists of three main components: the query, phrases and corresponding labels, and the system message. The query provides an overview of the input, detailing the composition of phrases and labels, while the system message elucidates the purpose and function of the system in relation to the given task.

Subsequently, the prompt is designed [S13] such that the input message to the LLM is composed of a system message and labeled data and query.

The LLM is then called [S14].

Then, after designing the prompt, the data is divided [S15] into training and validation. This splitting serves as a basis for assessing the model performance per epoch while fine-tuning [S16] and the efficacy of the fine-tuning process.

Finally, the fine-tuned model is saved [S17] for future use. This refined model may be utilized as a module capable of analyzing course syllabi and job postings.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

What is claimed is:

1. A computer-implemented method that, when performed by one or more computing devices, causes the one or more computing devices to perform the steps of:

receiving, with a processor of the one or more computing devices, a user input comprising educational study identification;

generating, with the processor of the one or more computing devices, a job competencies dataset comprising the steps of:

extracting a set of job postings from an online database that corresponds to the educational study identification;

identifying job competencies with a skill extractor module of the one or more computing devices via:

using a preconfigured competencies dictionary to identify job competencies within the set of job postings, wherein the job competencies are identified using rule-based matching or similarity matching; and using a pre-trained large language model (LLM) to classify extracted phrases from the set of job postings as job competencies, wherein:

the phrases include information about soft skills, technical skills, and job-specific terms, structured text, the extracted phrases, and labels are used to fine-tune the pre-trained LLM, wherein the fine-tuning includes:

generating a query describing the fine-tuning task, merging the structured text, the phrases, and the labels with the query to create the input message required for fine-tuning, generating a prompt, wherein the prompt includes a system message detailing the pre-trained LLM's behavior, and wherein the prompt and the input message are integrated into the pre-trained LLM to guide the fine-tuning process effectively, and sending the prompt into the pre-trained LLM to initiate fine-tuning, wherein the prompt is used by the pre-trained LLM to adapt to a specific task described in the query and structured input data; and the fine-tuning also includes:

dividing the labeled data into training data and validation data, wherein the dividing the labeled data is used to:

electronically assess the pre-trained LLM performance during the fine-tuning, and the efficiency of the fine-tuning process;

outputting the identified job competencies to generate the job competencies dataset;

generating, with the processor of the one or more computing devices, a course competencies dataset comprising the steps of:

identifying a plurality of educational course syllabi that correspond to the educational study identification;

identifying course competencies with the skill extractor module of the one or more computing devices via:

using the preconfigured competencies dictionary to identify course competencies within the educational coursesyllabi, wherein the course competencies are identified using rule-based matching or similarity matching; and using a pre-trained large language model (LLM) to classify extracted phrases from the educational course syllabi as course competencies;

outputting the identified course competencies to generate the course competencies dataset;

generating, with the processor of the one or more computing devices, a missing competencies dataset from the job competencies dataset and the course competencies dataset comprising the steps of:

mapping competencies within the course competencies dataset with competencies within the job competencies dataset to generate a list of common competencies;

generating the missing competencies dataset with a gap analysis module of the one or more computing devices; and outputting, with the processor of the one or more computing devices, a recommended course dataset comprising the steps of:

generating pairs of embeddings for both the educational course syllabi or course competencies dataset, and the missing competencies dataset;

measuring similarity between the each embedding pair;

outputting at least one educational course syllabus of the educational course syllabi, and corresponding missing competency of the missing competencies dataset to be added to the at least one educational course syllabus of the educational course syllabi with a skill recommendation module of the one or more computing devices, belonging to an embedding pair that has similarity within a predetermined range, as the recommended course dataset for the educational study identification; and displaying the output on an interactive dashboard to a user, wherein the output on the interactive dashboard is used to update the educational course syllabi.

2. A computer-implemented method as claimed in claim 1, wherein the competencies dictionary comprises a soft skills dictionary and a technical skills dictionary, wherein the soft skills dictionary is a dictionary of psychosocial skills.

3. A computer-implemented method as claimed in claim 1, wherein the rule-based matching is direct matching between terms within the educational course syllabus and/or the set of job postings, with terms within the competencies dictionary.

4. A computer-implemented method as claimed in claim 1, wherein the measuring of similarity between each embedding pair comprises splitting terms within the educational course syllabus and/or the set of job postings into n-grams.

5. A computer-implemented method as claimed in claim 4, wherein the measuring of similarity between each embedding pair comprises stemming the n-grams and stemming the terms within the preconfigured competencies dictionary, and returning a match if the stemmed n-gram and the stemmed term within the preconfigured competencies dictionary are the same.

6. A computer-implemented method as claimed in claim 5, wherein a similarity between the stemmed n-grams and the stemmed terms within the preconfigured competencies dictionary is determined using a longest common subsequence approach; wherein a match is returned if the similarity is within a predetermined range.

7. A computer-implemented method as claimed in claim 6, wherein the predetermined range is between 0.9 and 0.95.

8. A computer-implemented method as claimed in claim 4, wherein a similarity between the n-grams and the terms within the preconfigured competencies dictionary is determined using a longest common subsequence approach, wherein a match is returned when the similarity is within a predetermined range.

9. A computer implemented method as claimed in claim 1, wherein the labelled data is extracted from unstructured text using a second LLM, wherein the second LLM performs keyword extraction on the unstructured text.

10. A computer implemented method as claimed in claim 1 wherein, in the step of outputting a recommended course dataset, the embedding's similarity is measured using a cosine similarity score.

11. A computer implemented method as claimed in claim 10, wherein the predetermined range for the embeddings' similarity is between 0.4 and 0.5.

12. The computer-implemented method of claim 1, further comprising:

comparing each of the missing dictionary competencies in the job to each n-gram term in a job posting to check if they are the same after removing a plural letter "s";

if a dictionary competency term is not detected as a job competency term, then the n-gram term and the missing dictionary of competencies in the job description undergo stemming to check if they are the same after the stemming, wherein:

if the n-gram term and the missing job competency term are not the same after stemming, then the similarity between words is measured using Longest Common Subsequence (LCS), wherein if a similarity value score is above 0.9, the dictionary competency term is considered a demanded job competency.

13. The computer-implemented method of claim 1, wherein the processor uses a competencies extraction module, wherein the competencies extraction module includes:

a rule-based matching sub-module configured to receive the set of job postings and the educational course syllabus as input;

a similarity based matching sub-module configured to receive the set of job postings and the educational course syllabus as input; and a machine learning based competencies extraction sub-module configured to receive the set of job postings and the educational course syllabus as input.

14. The computer-implemented method of claim 1, wherein the missing competencies is further determined by:

tokenizing and embedding course syllabi and learning outcomes of the considered courses with be tokenized, wherein the embeddings are generated from the course terms, and wherein:

the course competencies are not used in the pair of embeddings, the pair of embeddings are produced from the missing job competencies, and wherein the generating the pair of embeddings includes:

determining a cosine similarity score of each of the pair of embeddings including the course competencies and missing job competencies, and the method further comprising:

analyzing the cosine similarity value, wherein if the cosine similarity value is above a particular threshold, then the pair of embeddings is similar, and if the cosine similarity value is below the particular threshold, then the pair of embeddings is not similar.

15. A platform for displaying, to a user, a set of recommended competencies for an identified educational course, on an interactive dashboard, the platform comprising:

an input field configured to receive an input by a user into a computing device, the input comprising an educational study identification;

a search module executed by a processor of the computing device to retrieve a set of job postings from an online database that corresponds to the identified educational study, the search module configured to retrieve one or more educational course syllabi that correspond to the educational study identification;

a competencies extraction module executed by a processor of the computing device comprising:

a preconfigured competencies dictionary;

a rule-based matching sub-module configured to receive the set of job postings and the educational course syllabus as input, and use the preconfigured competencies dictionary to identify competencies;

a similarity based matching sub-module configured to receive the set of job postings and the educational course syllabus as input, and use the preconfigured competencies dictionary to identify competencies; and a machine learning based competencies extraction sub-module comprising a pre-trained large language model (LLM) to classify extracted phrases, configured to receive the set of job postings and the educational course syllabus as input, wherein:

the phrases include information about soft skills, technical skills, and job-specific terms, structured text, the extracted phrases, and labels are used to fine-tune the pre-trained LLM, wherein the fine-tuning includes:

generating a query describing the fine-tuning task, merging the structured text, the phrases, and the labels with the query to create the input message required for fine-tuning, generating a prompt, wherein the prompt includes a system message detailing the pre- trained LLM's behavior, and wherein the prompt and the input message are integrated into the pre-trained LLM to guide the fine-tuning process effectively, and sending the prompt into the pre-trained LLM to initiate fine-tuning, wherein the prompt is used by the pre-trained LLM to adapt to a specific task described in the query and structured input data, and the fine-tuning also includes:

dividing the labeled data into training data and validation data, wherein the dividing the labeled data is used to:

electronically assess the pre-trained LLM performance during the fine-tuning, and the efficiency of the fine-tuning process;

wherein each sub-module is configured to output course competencies and job competencies, the competencies extraction module being configured to output the course competencies and the job competencies to generate a course competencies dataset and a job competencies dataset;

a mapping module executed by a processor of the computing device to map competencies within the course competencies dataset with competencies within the job competencies dataset to output a list of common competencies;

a gap analysis module executed by a processor of the computing device to output a missing competencies dataset;

a recommendation module executed by a processor of the computing device to generate embeddings for at least the course syllabi or course competencies dataset, and the missing competencies dataset; measure similarity between the embeddings; and output at least one educational course syllabus of the educational course syllabi that has similarity within a predetermined range as a recommended course for inclusion of at least one missing competency of the missing competencies dataset; and an interactive dashboard configured to display the outputs of at least one of the mapping module, the gap analysis module, or the recommendation module to the user.

16. A platform as claimed in claim 15, wherein the similarity measured by the recommendation module is transformer-based similarity.

17. A device, comprising:

memory; and a processor, wherein the processor is to:

receive a user input comprising educational study identification;

generate a job competencies dataset comprising the steps of:

extracting a set of job postings from an online database that corresponds to the educational study identification;

identifying job competencies with a skill extractor module via a pre-trained large language model (LLM) to classify extracted phrases from the set of job postings as job competencies, wherein the identifying job competencies with a skill extractor module further includes the pre-trained LLM using an Artificial Intelligence (AI) module to transform the job postings into structured text, phrases, and labels, wherein:

the phrases include information about soft skills, technical skills, and job-specific terms, the structured text, the phrases, and the labels are used to fine-tune the pre-trained LLM, wherein the fine-tuning includes:

generating a query describing the fine-tuning task, merging structured text, the phrases, and the labels with the query to create the input message required for fine-tuning, generating a prompt, wherein the prompt includes a system message detailing the pre-trained LLM's behavior, and wherein the prompt and the input message are integrated into the pre-trained LLM to guide the fine-tuning process effectively, and sending the prompt into the pre-trained LLM to initiate fine-tuning, wherein the prompt is used by the pre-trained LLM to adapt to a specific task described in the query and structured input data, and the fine-tuning also includes:

dividing the labeled data into training data and validation data, wherein the dividing the labeled data is used to:

electronically assess the pre-trained LLM performance during the fine-tuning, and the efficiency of the fine-tuning process; and outputting the identified job competencies to generate the job competencies dataset;

generate a course competencies dataset comprising the steps of:

identifying a plurality of educational course syllabi that correspond to the educational study identification;

identifying course competencies with the skill extractor module of the one or more computing devices via one of:

using the preconfigured competencies dictionary to identify course competencies within the educational course syllabi; and using a pre-trained large language model (LLM) to classify extracted phrases from the educational course syllabi as course competencies;

outputting the identified course competencies to generate the course competencies dataset;

generate a missing competencies dataset from the job competencies dataset and the course competencies dataset comprising the steps of:

mapping competencies within the course competencies dataset with competencies within the job competencies dataset to generate a list of common competencies; and generating the missing competencies dataset with a gap analysis module;

output a recommended course dataset comprising the steps of:

generating pairs of embeddings for both the educational course syllabi or course competencies dataset, and the missing competencies dataset;

measuring similarity between the each embedding pair;

outputting at least one educational course syllabus of the educational course syllabi, and corresponding missing competency of the missing competencies dataset to be added to the at least one educational course syllabus of the educational course syllabi with a skill recommendation module of the one or more computing devices, belonging to an embedding pair that has similarity within a predetermined range, as the recommended course dataset for the educational study identification; and displaying the output on an interactive dashboard to a user, wherein the output on the interactive dashboard is used to update the educational course syllabi.

* * * * *